United States Patent
Prabhakar

(10) Patent No.: US 9,582,716 B2
(45) Date of Patent: Feb. 28, 2017

(54) APPARATUSES AND METHODS FOR IRIS BASED BIOMETRIC RECOGNITION

(71) Applicant: Delta ID Inc., Fremont, CA (US)

(72) Inventor: Salil Prabhakar, Fremont, CA (US)

(73) Assignee: Delta ID Inc., Fremont, CA (US)

( * ) Notice: Subject to any disclaimer, the term of this patent is extended or adjusted under 35 U.S.C. 154(b) by 171 days.

(21) Appl. No.: 14/021,721

(22) Filed: Sep. 9, 2013

(65) Prior Publication Data

US 2015/0071503 A1  Mar. 12, 2015

(51) Int. Cl.
- G06K 9/00 (2006.01)
- G06F 21/32 (2013.01)
- G06K 9/62 (2006.01)
- G06T 3/40 (2006.01)
- G06K 9/03 (2006.01)

(52) U.S. Cl.
CPC ......... *G06K 9/00617* (2013.01); *G06F 21/32* (2013.01); *G06K 9/0061* (2013.01); *G06K 9/036* (2013.01); *G06K 9/6215* (2013.01); *G06T 3/4023* (2013.01); *G06T 2207/30041* (2013.01)

(58) Field of Classification Search
None
See application file for complete search history.

(56) References Cited

U.S. PATENT DOCUMENTS

| | | | |
|---|---|---|---|
| 5,995,648 A * | 11/1999 | Drisko ................. | G06T 7/0004 382/147 |
| 6,309,069 B1 * | 10/2001 | Seal et al. .................... | 351/221 |
| 2002/0021827 A1 * | 2/2002 | Smith ................ | G06K 9/00013 382/124 |
| 2006/0147094 A1 * | 7/2006 | Yoo ................. | 382/117 |
| 2007/0160265 A1 * | 7/2007 | Wakiyama .................... | 382/117 |
| 2009/0150980 A1 | 6/2009 | Smith | |
| 2009/0227232 A1 * | 9/2009 | Matas et al. .................. | 455/411 |
| 2010/0002912 A1 | 1/2010 | Solinsky | |
| 2010/0014718 A1 * | 1/2010 | Savvides et al. ............. | 382/117 |
| 2010/0040306 A1 * | 2/2010 | Morioka et al. .............. | 382/284 |
| 2010/0202667 A1 * | 8/2010 | Ren et al. ...................... | 382/117 |
| 2010/0299530 A1 * | 11/2010 | Bell ........................ | G06F 21/32 713/186 |
| 2012/0207357 A1 | 8/2012 | Bedros et al. | |
| 2013/0314511 A1 * | 11/2013 | Chen .................. | H04N 5/23222 348/50 |
| 2014/0161325 A1 * | 6/2014 | Bergen ............... | G06K 9/00617 382/117 |
| 2014/0250523 A1 * | 9/2014 | Savvides et al. ............... | 726/19 |

* cited by examiner

*Primary Examiner* — Kim Vu
*Assistant Examiner* — Nathan Bloom
(74) *Attorney, Agent, or Firm* — Hoffmann & Baron, LP

(57) ABSTRACT

The invention provides a method for iris based biometric recognition. The method includes receiving an image from an image sensor and determining whether the received image includes an iris. The steps of receiving and determining are repeated until the received image includes an iris. Responsive to determining that a received image includes an iris, iris information corresponding to such received image is compared with stored iris information corresponding to at least one iris and a match decision or a non-match decision is rendered based on an output of the comparison. The invention additionally provides a system and computer program product configured for iris based biometric recognition.

23 Claims, 10 Drawing Sheets

APPARATUSES AND METHODS FOR IRIS BASED BIOMETRIC RECOGNITION

FIELD OF INVENTION

The invention relates to apparatuses and methods for obtaining and processing images of one or more features of a subject's eye for biometric recognition.

BACKGROUND

Methods for biometric recognition based on facial features, including features of the eye are known. Methods for iris recognition implement pattern-recognition techniques to compare an acquired image of a subject's iris against a previously stored image of the subject's iris, and thereby determine or verify identity of the subject. A digital feature set corresponding to an acquired iris image is encoded based on the image, using mathematical or statistical algorithms. The digital feature set or template is thereafter compared with databases of previously encoded digital templates (stored feature sets corresponding to previously acquired iris images), for locating a match and determining or verifying identity of the subject.

Apparatuses for iris recognition typically comprise an imaging apparatus for capturing an image of the subject's iris(es) and an image processing apparatus for comparing the captured image against previously stored iris image information. The imaging apparatus and image processing apparatus may comprise separate devices, or may be combined within a single device.

While iris recognition apparatuses have been previously available as dedicated or stand alone devices, it is increasingly desirable to incorporate iris recognition capabilities into handheld devices or mobile communication devices or mobile computing devices (collectively referred to as "mobile devices") having inbuilt cameras, such as for example, mobile phones, smart phones, personal digital assistants, tablets, laptops, or wearable computing devices.

Implementing iris based recognition in mobile devices is convenient and non-invasive and gives individuals access to compact ubiquitous devices capable of acquiring iris images of sufficient quality to enable recognition (identification or verification) of identity of an individual. By incorporating iris imaging apparatuses into mobile devices, such mobile devices achieve biometric recognition capabilities, which capabilities may be put to a variety of uses, including access control for the mobile device itself.

While prior art iris imaging systems are theoretically capable of being incorporated into mobile devices, the time taken by prior art iris image processing systems to process and compare iris image information against previously stored iris information would be significant—leading to evident time lags between iris image acquisition and recognition (or a refusal to recognize).

The primary underlying cause for time lags is that reliable iris image processing and feature extraction is computationally intensive, making it difficult to process every frame within a sequence of image frames. This is particularly the case, for the reason that state-of-the-art image sensors produce at least 30 frames per second in video mode. A further drawback of attempting to compare every frame within a sequence of image frames produced by an image sensor with the stored template(s) is that too many image comparisons may increase the observed false matches. The incidence of false matches is measured in terms of the false match rate (FMR), or the false positive identification rate (FPIR) of the recognition system under observation.

To overcome the above drawbacks, an automatic image selection process may be implemented. The selection method computes one of more "quality" measurements of each image frame and selects the best frame detected within a predetermined timeframe, or alternatively one or more frames that satisfy predetermined quality criteria. Existing commerically available iris recognition systems apply automatic image selection methods as a standard approach to reducing time lags.

A quality assessment criterion in prior art systems is sharpness (also called focus) measurement of the image frame. Focus assessment based image selection algorithms have been found to improve efficiencies of an iris recognition system. Computationally efficient image processing methods are typically used to obtain a scalar value for each frame denoting its focus quality and the image frame that exceeds a predetermined focus threshold is selected for further processing and comparison.

In addition to reducing time lags and conserving processing resources, automatic image selection processes are implemented in applications where reference templates (e.g. iris image feature sets stored in a database) may not be readily available at the location of image capture. Commercial deployments of iris based recognition systems in military, civilian, border control, national ID, police, and surveillance applications typically fall within this category. Such applications require the recognition system to store, transmit or forward the automatically selected image frame, which frame is compared against referenced templates at a later time or at a different location. For example, in a military application, the selected ("captured") image or extracted feature set may be sent from a foreign country to a central server in home country for comparison. In another example, in a national ID system such as India's UIDAI, the captured image is sent over to a server farm to be de-duplicated against all previously enrolled subjects.

Despite the above, there are disadvantages to using the automatic image selection process—for the reason that a quality measurement algorithms does not always predict an image frame's match-ability accurately enough. For example, it has been found that rejecting 10% lowest quality images in a database only improves the false negative match rate (FNMR) from 10% to 7%. This is acknowledged as presenting a poor trade-off and confirms that quality assessment algorithms are not sufficiently accurate predictors of match-ability.

It is therefore preferable that application of iris based recognition systems within mobile devices, and systems where reference templates are readily available, should not be subjected to the drawbacks that the automatic image selection process imposes. Similarly it is preferable that quality assessment related drawbacks be avoided in certain client-server type iris recognition systems, where reference templates can be pulled from a central server to a local client where the iris imaging occurs.

The present invention seeks to overcome the drawbacks associated with automatic image selection methods, by implementing alternative methods for improving response time and accuracy for iris based recognition systems.

SUMMARY

The invention provides a method for iris based biometric recognition. In an embodiment, the method comprises the steps of (a) receiving an image from an image sensor (b)

determining whether the received image includes an iris (c) repeating steps (a) and (b) until the received image includes an iris (d) responsive to determining that a received image includes an iris, comparing iris information corresponding to such received image with stored iris information corresponding to at least one iris and (e) rendering a match decision or a non-match decision based on an output of the comparison.

The comparison at step (d) of the invention may comprise comparing an iris feature set generated by feature extraction performed on the received iris image, with the stored iris information. In an embodiment, steps (a) to (e) may be repeated until occurrence of a termination event, which termination event may comprise any of (i) expiry of a predetermined time interval, or (ii) comparison of a predetermined number of received iris images, or (iii) rendering of a match decision based on comparison between iris information corresponding to a received iris image and the stored iris information, or (iv) distance between the image sensor and the subject exceeding a predetermined maximum distance, or (v) a determination that a received image does not include an iris.

In an exemplary implementation of the invention, a match decision may be rendered responsive to the acquired iris image satisfying a predetermined degree of similarity with stored iris information corresponding to at least one iris.

In an embodiment of the method of the present invention, image subsampling may be performed on an image received at step (a), to generate a subsampled image and in which case, the determination at step (b) may comprise an examination of the subsampled image.

The invention may additionally provide a method for iris based biometric recognition, comprising the steps of (a) receiving an image from an image sensor, wherein the received image includes an iris image (b) determining whether the received iris image satisfies at least one predetermined criteria (c) repeating steps (a) and (b) until the received iris image satisfies at least one predetermined criteria (d) responsive to determining that the received iris image satisfies at least one predetermined criteria, comparing iris information corresponding to such received iris image with stored iris information corresponding to at least one iris and (e) rendering a match or non-match decision based on output of the comparison. The predetermined criteria may comprise at least one of (i) grayscale spread (ii) iris size (iii) dilation (iv) usable iris area (v) iris-sclera contrast (vi) iris-pupil contrast (vii) iris shape (viii) pupil shape (ix) image margins (x) image sharpness (xi) motion blur (xii) signal to noise ratio (xiii) gaze angle (xiv) scalar score (xv) a minimum time interval separating the received iris image from one or more iris images previously taken up for comparison (xvi) a minimum number of sequentially generated iris images separating the received iris image from one or more iris images previously taken up for comparison and (xvii) a minimum difference between the received iris image and one or more iris images previously taken up for comparison.

In a particular embodiment of the above method, the comparison at step (d) comprises a comparison between an iris feature set generated by feature extraction performed on the received iris image, and the stored iris information. In an embodiment, steps (a) to (e) may be repeated until occurrence of a termination event, which termination event may comprise any of (i) expiry of a predetermined time interval, or (ii) conclusion of comparison of a predetermined number of received iris images, or (iii) rendering of a match decision based on comparison between iris information corresponding to a received iris image and the stored iris information or (iv) distance between the image sensor and the subject exceeding a predetermined maximum distance.

In accordance with a specific implementation of the method, a match decision may be rendered responsive to the received iris image satisfying a predetermined degree of similarity with stored iris information corresponding to at least one iris.

In a particular embodiment of the inventive method, image subsampling is performed on the image received at step (a) to generate a subsampled image, and the determination at step (b) whether the received iris image satisfies at least one predetermined criteria, is based on the subsampled image.

The invention additionally provides a method for iris based biometric recognition, comprising the steps of (a) receiving an image from an image sensor, wherein the image includes an iris image, (b) performing a first set of comparison operations by comparing iris information corresponding to the received iris image with stored iris image information corresponding to at least one iris (c) responsive to output of step (b) satisfying a specified outcome, performing a second set of comparison operations by comparing iris information corresponding to the received iris image with the stored iris image information, and (d) rendering a match decision or a non-match decision based on output of the second set of comparison operations at step (c).

In an embodiment of this method, the second set of comparison operations at step (c) compares iris information corresponding to the received iris image with such stored iris image information, which at step (b) has generated an output satisfying the specified outcome.

In an implementation of the above method, the specified outcome may comprise a (i) a match between the received iris image and stored iris image information corresponding to at least one iris or (ii) a predetermined degree of similarity between the received iris image and stored iris image information corresponding to at least one iris. In another implementation, the specified outcome may comprise (i) a non-match between the received iris image and stored iris image information corresponding to at least one iris or (ii) less than a predetermined degree of similarity between the received iris image and stored iris image information corresponding to at least one iris.

In an embodiment of the method at least one operation within the second set of comparison operations is not included within the first set of comparison operations. In another embodiment, at least one of the first set of comparison operations and the second set of comparison operations includes feature extraction operations for extracting an iris feature set from the received iris image.

The first set of comparison operations may include a first set of feature extraction operations and the second set of comparison operations may include a second set of feature extraction operations, such that at least one operation within the second set of feature extraction operations is not included within the first set of feature extraction operations.

In accordance with an embodiment of the above method, steps (a) to (d) may be repeated until (i) determination of a match between the received iris image and stored iris image information corresponding to at least one iris or (ii) the received iris image satisfies a predetermined degree of similarity with stored iris image information corresponding to at least one iris. In another embodiment, steps (a) to (d) may be repeated until occurrence of a termination event, which termination event may comprise any of (i) expiry of a predetermined time interval, or (ii) comparison of a predetermined number of received images, or (iii) distance between the image sensor and the subject exceeding a predetermined maximum distance or (iv) a determination that a received image does not include an iris.

The method may comprise the step of image subsampling performed on the image received at step (a) to generate a subsampled image, wherein the first set of comparison operations at step (b) is performed on the subsampled image. In a more specific embodiment, image data on which the second set of comparison operations is performed at step (c) is not been reduced by image subsampling.

The invention additionally provides a method for iris based biometric recognition, comprising the steps of (a) initializing sequential generation of image frames by an image sensor (b) selecting an image frame generated by the image sensor (c) comparing image information corresponding to the selected image frame with stored iris image information corresponding to at least one iris image and (d) responsive to the comparison at step (c) rendering a non-match decision, selecting another image frame generated by the image sensor and repeating steps (c) and (d), the selection of another image frame being based on a predetermined criteria, wherein the predetermined criteria comprises at least one of (i) availability of a resource to perform image processing or comparison, or (ii) elapse of a specified time interval since occurrence of a defined event corresponding to a previously selected image frame, or (iii) a specified number of sequentially generated image frames separating a previously selected image frame and an image frame being considered for selection, or (iv) a minimum difference between a previously selected image frame and an image frame being considered for selection.

In an embodiment of the above method, the comparison at step (c) is preceded by a step of performing feature extraction on the first image for extracting an iris feature set of an imaged iris within the first image, and the comparison at step (c) comprises comparing the extracted iris feature set with the stored iris image information.

The invention additionally provides systems and computer program products configured to implement the methods described above and in further detail throughout the specification.

An embodiment of the invention comprises a computer program product for iris based biometric recognition, which computer program product comprises a computer usable medium having a computer readable program code embodied therein, the computer readable program code comprising instructions for (a) receiving an image from an image sensor (b) determining whether the received image includes an iris (c) repeating steps (a) and (b) until the received image includes an iris (d) responsive to determining that a received image satisfies at least one predetermined criteria, comparing iris information corresponding to such received image with stored iris information corresponding to at least one iris and (e) rendering a match decision or a non-match decision based on an output of the comparison.

Another embodiment of the invention comprises a system for iris based biometric recognition, comprising an image sensor, and a processing device configured for (a) receiving an image from an image sensor (b) determining whether the received image includes an iris (c) repeating steps (a) and (b) until the received image includes an iris (d) responsive to determining that a received image satisfies at least one predetermined criteria, comparing iris information corresponding to such received image with stored iris information corresponding to at least one iris and (e) rendering a match decision or a non-match decision based on an output of the comparison.

BRIEF DESCRIPTION OF THE ACCOMPANYING DRAWINGS

DETAILED DESCRIPTION

The present invention is directed to devices and methods configured for biometric recognition based on iris imaging and processing. In an embodiment the device of the present invention is a mobile device having an iris based recognition system implemented therein.

Figure 1:
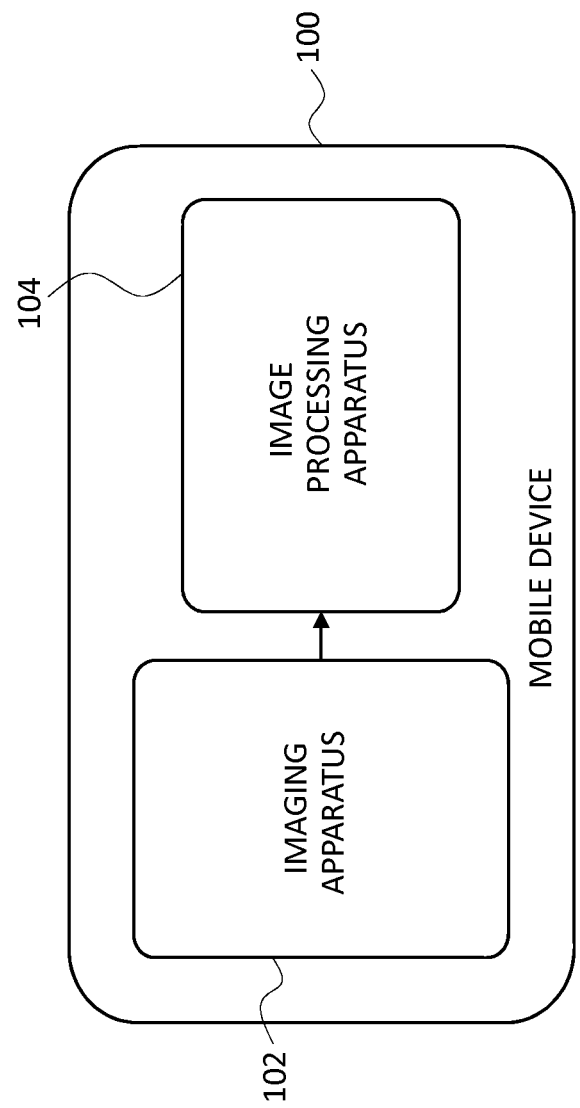
FIG. 1 is a functional block diagram of an apparatus for iris recognition.

FIG. 1 is a functional block diagram of a mobile device 100 configured for iris image based recognition, comprising an imaging apparatus 102 and an image processing apparatus 104. Imaging apparatus 102 acquires an image of the subject's iris and transmits the image to image processing apparatus 104. The image captured by imaging apparatus 102 may be a still image or a video image. Image processing apparatus 104 thereafter analyses the acquired image frame(s) and compares the corresponding digital feature set with digital templates encoded and stored based on previously acquired iris images, to identify the subject, or to verify the identity of the subject.

Although not illustrated in FIG. 1, mobile device 100 may include other components, including for extracting still frames from video images, for processing and digitizing image data, for enrolment of iris images (the process of capturing, and storing iris information for a subject, and associating the stored information with that subject) and comparison (the process of comparing iris information acquired from a subject against information previously acquired during enrolment, for identification or verification of the subject's identity), and for enabling communication between components of the mobile device. The imaging apparatus, image processing apparatus and other components of the mobile device may each comprise separate devices, or may be combined within a single mobile device.

Figure 2:
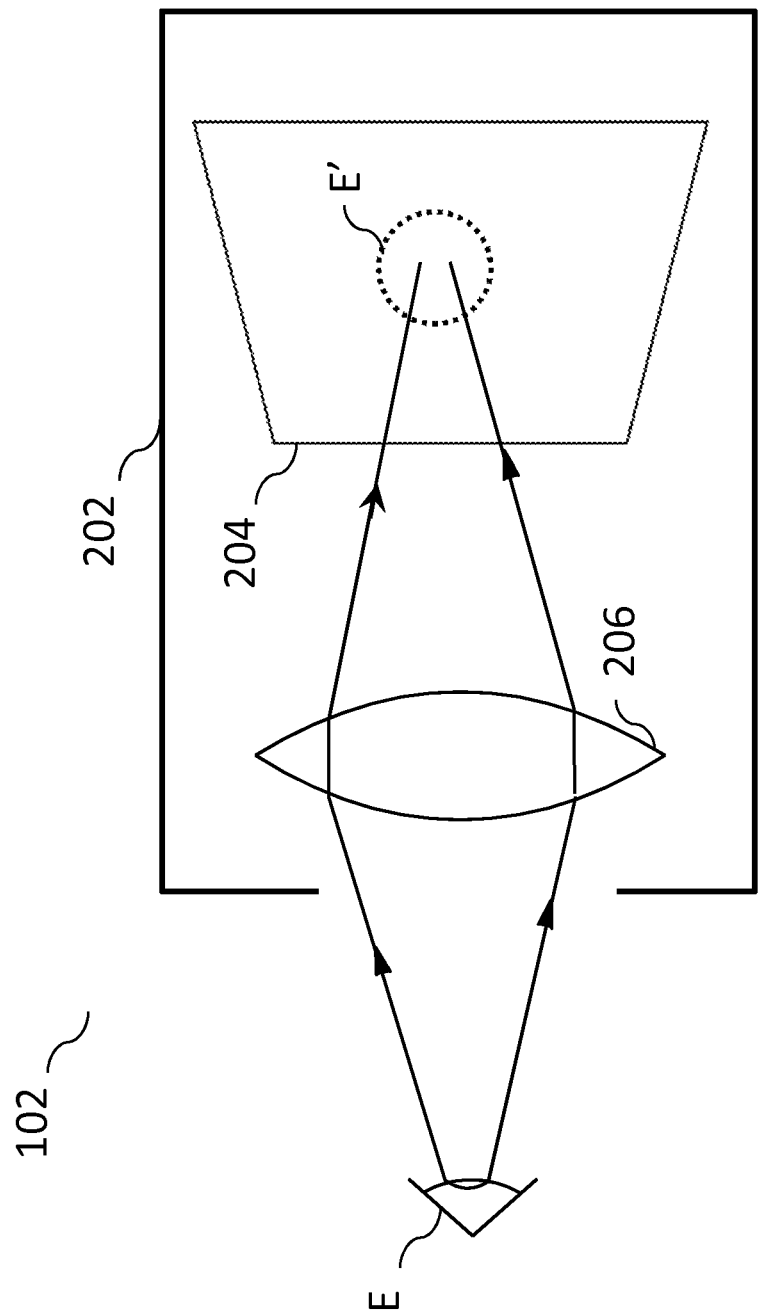
FIG. 2 illustrates an exemplary embodiment of an imaging apparatus.

FIG. 2 illustrates an exemplary embodiment of imaging apparatus 102 having housing 202, image sensor 204 and an optical assembly 206, wherein image sensor 204 and optical assembly 206 are disposed within the housing 206.

Imaging apparatus 102 may comprise a conventional solid state still camera or video camera, and image sensor 204 may comprise a charged coupled device (CCD) or a complementary metal oxide semiconductor (CMOS) device. Image sensor 204 may be selected for sensitivity at least to light having wavelengths anywhere in the range of 400 nanometers nm to 1000 nanometers. Optical assembly 206 may comprise a single unitarily formed element, or may comprise an assembly of optical elements selected and configured for achieving desired image forming properties. The imaging apparatus may have a fixed focus, or a variable focus achieved using any of several prevalent technologies (e.g. a voice coil motor).

As illustrated in FIG. 2, optical assembly 206 and image sensor 204 may be configured and disposed relative to each other, such that (i) one surface of image sensor 204 coincides with the image plane of optical assembly 206 and (ii) the object plane of optical assembly 206 coincides with an intended position or a subject's eye E for iris image acquisition. Accordingly as illustrated, when subject's eye E is positioned at the object plane, an in-focus image E' of the eye is formed on image sensor 204.

The imaging apparatus may additionally comprise an illuminator (not illustrated) used to illuminate the iris of the subject being identified. The illuminator may emit radiations having wavelengths falling within the range of 400 nanometers nm to 1000 nanometers, and in an embodiment specifically configured for iris based image recognition, may emit radiations having wavelengths between 700 nanometers and 900 nanometers. The illuminator may comprise any source of illumination including an incandescent light or a light emitting diode (LED).

Figure 3:
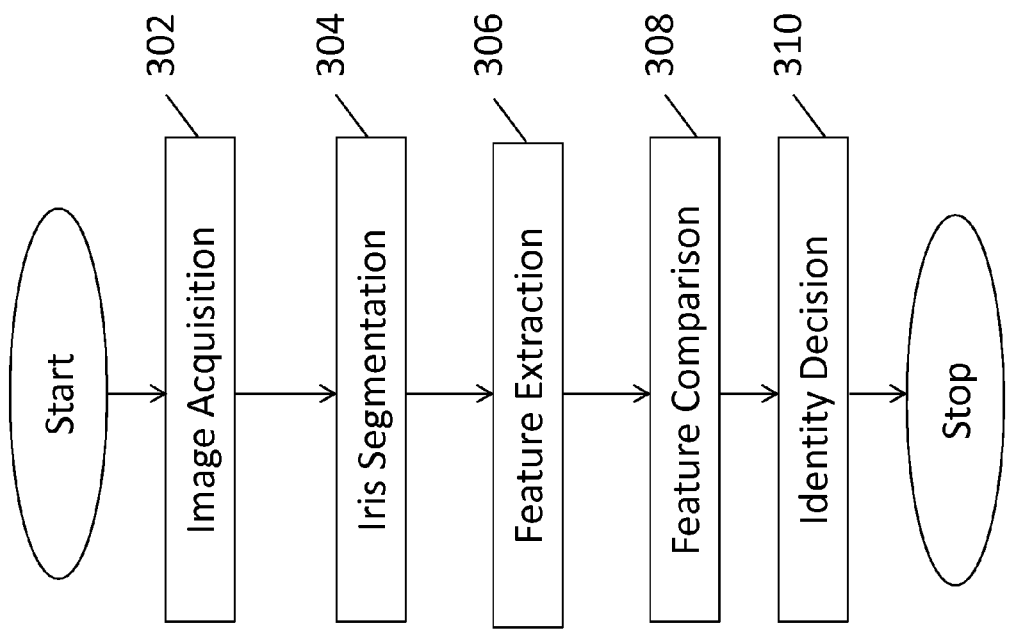
FIG. 3 illustrates steps involved in iris image based recognition systems.

FIG. 3 illustrates steps typically involved in iris image based recognition systems. At step 302, the imaging apparatus acquires an image of the subject's iris.

Iris segmentation is performed on the acquired image at step 304. Iris segmentation refers to the step of locating the inner and outer boundaries of the iris within the acquired image, and cropping the portion of the image which corresponds to the iris. Since the iris is annular in shape, iris segmentation typically involves identifying two substantially concentric circular boundaries within the acquired image—which circular boundaries correspond to the inner and outer boundaries of the iris. Several techniques for iris segmentation may be implemented to this end, including for example Daugman's iris segmentation algorithm. Iris segmentation may additionally include cropping of eyelids and eye lashes from the acquired image. It would be understood that iris segmentation is an optional step prior to feature extraction and comparison, that may be avoided entirely. Iris segmentation is at times understood to comprise a part of feature extraction operations, and is not always described separately.

Subsequently, feature extraction is performed at step 306—comprising processing image data corresponding to the cropped iris image, to extract and encode salient and discriminatory features that represent an underlying biometric trait. For iris images, features may be extracted by applying digital filters to examine texture of the segmented iris images. Application of digital filters may result in a binarized output (also referred to as an "iris code" or "feature set") comprising a representation of salient and discriminatory features of the iris. Multiple techniques for iris feature extraction may be implemented, including by way of example, application of Gabor filters.

At step 308, a comparison algorithm compares the feature set corresponding to the acquired iris image against previously stored iris image templates from a database, to generate scores that represent a difference (i.e. degree of similarity or dissimilarity) between the input image and the database templates. The comparison algorithm may for example involve calculation of a hamming distance between the features sets of two iris images, wherein the calculated normalized hamming distance represents a measure of dissimilarity between two irises.

The feature extraction and comparison steps may be integrated into a single step. Equally, the feature extraction step may be omitted entirely, in which case the comparison step may comprise comparing iris image information corresponding to the received frame, with stored iris information corresponding to at least one iris image. For the purposes of this invention, any references to the step of comparison shall be understood to apply equally to (i) comparison between a feature set derived from a feature extraction step and stored iris image templates, and (ii) comparison performed by comparing iris image information corresponding to the received frame, with stored iris information corresponding to at least one iris image.

At step 310, results of the comparison step are used to arrive at a decision (identity decision) regarding identity of the acquired iris image.

For the purposes of this specification, an identity decision may comprise either a positive decision or a negative decision. A positive decision (a "match" or "match decision") comprises a determination that the acquired iris image (i) matches an iris image or iris template already registered or enrolled within the system or (ii) satisfies a predetermined degree of similarity with an iris image or iris template already registered or enrolled within the system. A negative decision (a "non-match" or non-match decision") comprises a determination that the acquired iris image (i) does not match any iris image or iris template already registered or enrolled within the system or (ii) does not satisfy a predetermined degree of similarity with any iris image or iris template registered or enrolled within the system. In embodiments where a match (or a non-match) relies on satisfaction (or failure to satisfy) a predetermined degree of similarity with iris images or iris templates registered or enrolled within the system—the predetermined degree of similarity may be varied depending on the application and requirements for accuracy. In certain devices (e.g. mobile devices) validation of an identity could result in unlocking of, access authorization or consent for the mobile device or its communications, while failure to recognize an iris image could result in refusal to unlock or refusal to allow access. In an embodiment of the invention, the match (or non-match) determination may be communicated to another device or apparatus which may be configured to authorize or deny a transaction, or to authorize or deny access to a device, apparatus, premises or information, in response to the communicated determination.

Of the stages involved in iris based recognition systems, it has been found that precise iris segmentation and feature extraction are particularly resource intensive (in comparison to the remaining stages) and requires more processing time and resources than the other stages. In view of existing processing capabilities presently associated with iris based imaging and processing apparatuses, and in view of known processing capabilities of existing mobile devices, the processing steps required for segmentation and feature extraction has been found to be a significant causative factor insofar as delays and time lags observed in iris recognition systems are concerned.

Figure 4:
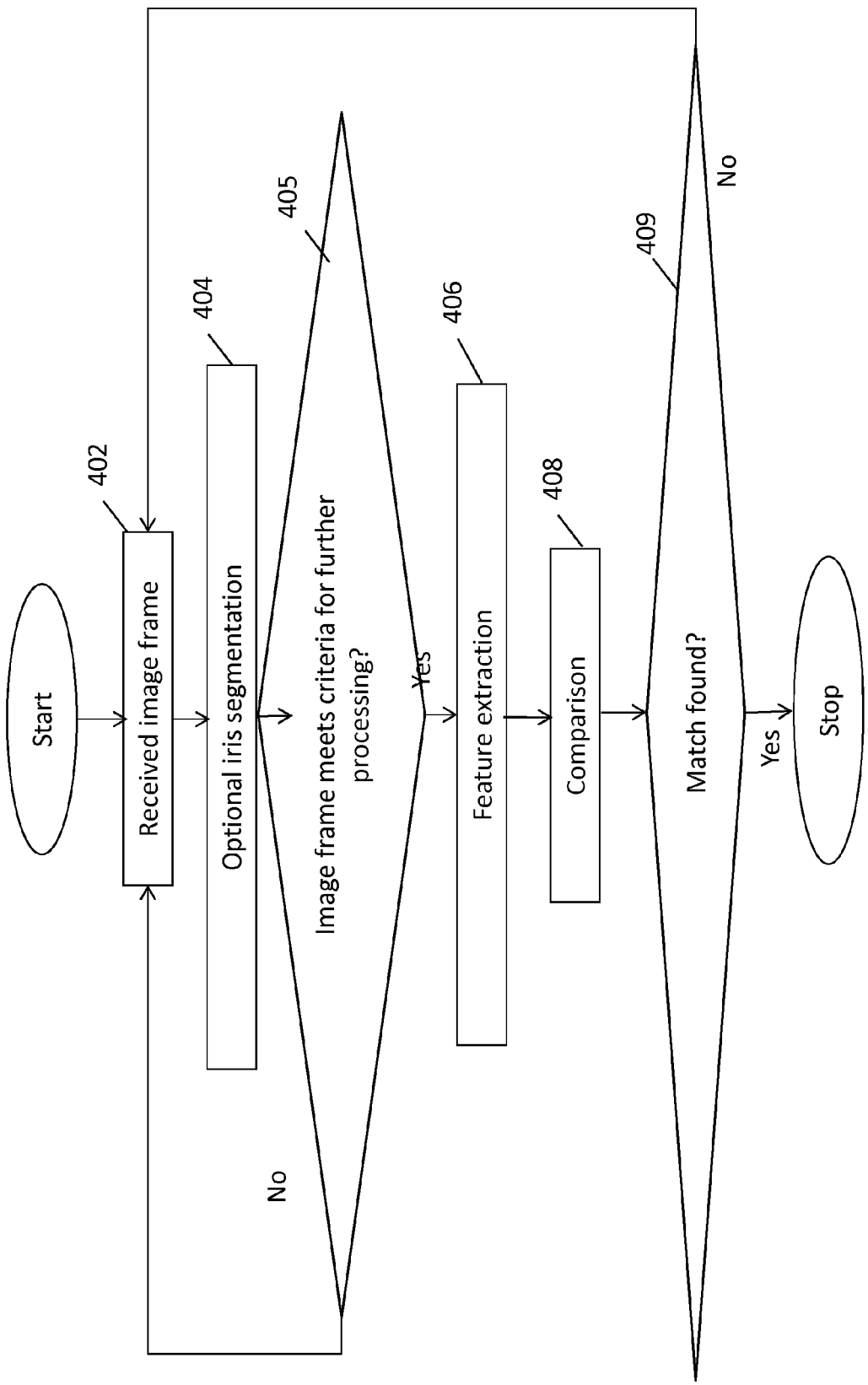
FIGS. 4 to 7 are flowcharts illustrating methods for iris based recognition according to the present invention.

FIG. 4 is a flowchart illustrating a method for iris based recognition according to the present invention. The method commences at step 402 by receiving an image frame from an image sensor. The image frame may have been acquired by the image sensor in response to an actuation instruction to capture at least one image frame. The image sensor may be configured to either (i) respond to an actuation instruction by capturing a single image frame (single frame image capture mode) or (ii) respond to an actuation instruction by capturing a sequence of image frames acquired at the image sensor's video frame rate (video image capture mode).

At step 404, one or both of iris segmentation and image subsampling is performed on the received image frame. Iris segmentation may include one or both of (i) determining whether the received image frame includes an iris image and (ii) isolating an imaged iris within the image frame. Image subsampling refers to the process of reducing image sampling resolution of an image frame—and may be performed to reduce the number of data bits required to represent the image frame. In an embodiment of the method of FIG. 4, one or both of iris segmentation and image subsampling may be entirely omitted, or may be integrated or subsumed into any other step of the method.

Step 405 comprises a determination whether any one or more of the received image frame or a derivative subsampled image frame, or image information derived from the received image frame, meets a predetermined criteria for further processing—which further processing may include feature extraction or comparison or both. The predetermined criteria at step 405 may be defined in terms of one or more of the following attributes of an image frame under assessment: (i) grayscale spread (ii) iris size (iii) dilation (iv) usable iris area (v) iris-sclera contrast (vi) iris-pupil contrast (vii) iris shape (viii) pupil shape (ix) image margins (x) image sharpness (xi) motion blur (xii) signal to noise ratio (xiii) gaze angle (xiv) scalar score (xv) a minimum time interval separating generation or receipt of an image frame under consideration for further processing and an image frame previously taken up for further processing; (xvi) a minimum number of sequentially generated image frames that are required to separate two image frames that are consecutively taken up for further processing and (xvii) difference (degree of similarity or dissimilarity) between an image frame under consideration for further processing and an image frame previously taken up for further processing. Each of the above factors for assessment is described in further detail below.

In the event the image frame does not meet the predetermined criteria for further processing, the method does not proceed to the step of feature extraction, and instead reverts to step 402 to receive another image frame from the image sensor. If on the other hand, the image frame acquired at step 402 meets the predetermined criteria, the method performs feature extraction on the image frame at step 406. Feature extraction at step 406 may be performed either on unaltered image data corresponding to the image frame as received at step 402. Alternatively, in cases where the received image frame has been subjected to the steps of iris segmentation and/or image subsampling at step 404, feature extraction may be performed on the output image data arising from the steps of iris segmentation and/or image subsampling. Yet alternatively, output image data arising from the steps of iris segmentation and/or image subsampling may be used only for determining whether an image frame meets a predetermined criteria for further processing (at step 405), while the step of feature extraction (at step 406) for image frames found to meet the predetermined criteria may be performed on image frame data that has not been reduced either by iris segmentation or by image subsampling.

At step 408, comparison is performed on the iris feature set resulting from feature extraction step 406. The comparison step may comprise comparing the extracted iris feature set with stored iris information corresponding to at least one iris image. At step 409, if based on the comparison, a match is found, the method may terminate, otherwise, the method may loop back to step 402 for the next image frame. The feature extraction and comparison steps may be integrated into a single step. Equally, the feature extraction may be omitted entirely, in which case the comparison step may comprise comparing iris image information corresponding to the received frame, with stored iris information corresponding to at least one iris image.

It would be understood that the looping at step 409 of FIG. 4 is optional, and a variant of the method of FIG. 4 may be performed by searching for a match based on a fixed number of acquired image frames, or by terminating the method after performing comparison on image frames (i) for a fixed period of time (i.e. until the method times out) or (ii) until any time after a match found has been rendered or (iii) until cancelled, timeout, or otherwise stopped without match found. In an embodiment, the method may be terminated upon a sensor based determination that the distance between the imaging sensor (or the imaging apparatus or the device housing such apparatus or sensor) and the subject has exceeded a predetermined maximum distance. Sensor's capable of such determination include proximity sensors, such as capacitive sensors, capacitive displacement sensors, Doppler effect sensors, eddy-current sensors, inductive sensors, laser rangefinder sensors, magnetic (including magnetic proximity sensors), passive optical sensors (including charge-coupled devices), thermal infrared sensors, reflective photocell sensors, radar sensors, reflection based sensors, sonar based sensors or ultrasonic based sensors. In another embodiment, the method may be terminated (i) if an eye that was present in preceding image frames is found to be absent in a subsequent image frame or (ii) if a size of the eye in subsequent image frames is found to decrease—indicating that the iris imaging device is being removed from the vicinity of the eye.

Similarly, at step 405, if the acquired image frame does not meet a predetermined criteria for further processing, the method may simply terminate without reverting to step 402 for receiving another image frame.

The modalities of acquiring a second (and each subsequent) image frame at step 402 may depend on whether the image processing apparatus is in single frame image capture mode or in video image capture mode. In single frame image capture mode, successive image frame would only be obtained at step 402 in response to repeated actuations of the image sensor by an operator or other means. In video image capture mode, the image sensor captures a sequence of successive image frames in response to a single actuation, and a next image frame may be obtained at step 402 from among the successive image frames within the captured sequence of image frames. In various embodiments, successive image frames may be obtained from the image sensor (i) until the entire set of image frames generated by the image sensor have been exhausted, or (ii) until a predetermined number of image frames have been received from the image sensor, or (iii) until a predetermined point in time or (iv) until a predetermined criteria is met.

By selectively discarding image frames that do not meet a predetermined criteria prior to an extraction step and/or a comparison step, the method reduces the number of non-productive processing steps, thereby improving response times, and power consumption and preventing false positives from images that do not contain iris.

As described in connection with step 405, the predetermined criteria at step 405 may be defined in terms of one or more of any one of the following factors.

Grayscale spread—grayscale spread measures the spread of intensity values in an image. Image frames having a wide, well-distributed spread of intensity values indicates a properly exposed image. Assessment of grayscale spread of an image frame accordingly presents a qualitative measure of image frame exposure.

Iris size—iris size is measured in terms of a number of pixels across the iris radius, where a circle approximates the iris boundary. Iris size is a function of spatial sampling rate in the object space. By specifying a threshold iris size for further processing, the method eliminates image frames where the iris image does not offer sufficient textural information for accurate extraction and comparison.

Dilation—dilation may be defined as the ratio of pupil diameter to iris diameter. The degree of dilation can change textural content of an imaged iris. By defining a predetermined threshold or range of values for iris image acquisition, the method ensures that the iris image under assessment and previously enrolled iris templates are of comparable dilation and thereby improving the accuracy of the recognition system.

Usable iris area—usable iris area is measured as the percentage of iris that is not occluded by eyelash(es), eyelid(s), specular reflects, ambient specular reflections or otherwise. Occlusion of the iris not only reduces the available iris textural information for comparison, but also decreases accuracy of the iris segmentation process, both of which increase recognition errors. Defining threshold values for usable iris area serves to eliminate image frames that are likely to result in recognition errors.

Iris-sclera contrast—Insufficient iris—sclera contrast may affect the accuracy of iris segmentation and feature extraction processes. The iris-sclera contrast of an image frame under assessment may therefore comprise a predefined criterion for elimination of an image frame without proceeding to feature extraction and comparison.

Iris-pupil contrast—Iris-pupil contrast measures image characteristics at the boundary region between the iris region and the pupil. Low iris-pupil contrast may affect segmentation or degrade accuracy of feature extraction operations. Iris-pupil contrast may therefore serve as a predetermined criterion for image frame elimination without further processing.

Iris shape—iris shape is defined as the shape of the iris-sclera boundary. While iris shape may be a consequence of anatomical variation, it may also be caused by subject behavior such as non-frontal gaze. Iris shape as a predetermined criterion for image frame assessment therefore provides basis for elimination of image frames where the iris shape may have been affected by subject behavior during image capture.

Pupil shape—Iris portions in the immediate vicinity of the pupil offer high information content. Accurate detection of the iris-pupil boundary is accordingly of importance and pupil shape provides a predetermined criterion for image frame assessment and for elimination of image frames where the pupil shape may have been affected by subject behavior during image capture. Pupil shape as a predetermined criterion for image assessment may alternatively provide a basis for choosing between alternate feature extraction and comparison operations for implementation on an image frame.

Margin—Margin refers to the distances of the outer iris boundary from the four image frame boundaries (top, bottom, left and right). Insufficient image margins present difficulties for feature extraction. Image margins may therefore be used a criterion for eliminating image frames without further processing.

Image sharpness—Image sharpness comprises a measure of defocus blur observed in an image frame. Defocus blur is generally observed when an object (e.g. an iris) is outside the depth of field of the camera. Image sharpness may therefore be used as a criterion for eliminating image frames without further processing.

Motion blur—motion blur arises from motion of the camera, or of the object or both, and increases the likelihood of errors in iris recognition. In a handheld device, motion blur may be caused or contributed to by motion of the object or by hand jitter. The degree of motion blur in an image frame may therefore be used as a criterion for eliminating unsuitable image frames without feature extraction and comparison.

Signal to noise ratio—Signal to noise ratio of an image frame provides a determinant of suitability for feature extraction and comparison. In an exemplary implementation, image signal-to-noise ratio may be required to be greater than or equal to 40 dB, inclusive of noise introduced by image compression techniques.

Gaze angle—Gaze angle of an iris image is a measure of deviation between the subject's optical axis and the camera's optical axis. Imaging of the iris when off-axis is found to create a projective deformation of the iris, which affects accuracy of feature extraction and comparison operations. A predefined threshold for permissible gaze angle serves to eliminate unsuitable image frames.

Scalar scores—Certain attributes of an image frame may be determined by image processing to be predictive of its match-ability and represented as a scalar score. A predefined threshold for permissible score serves to eliminate unsuitable image frames.

Time interval separating generation or receipt of an image frame under consideration for further processing and an image frame previously taken up for further processing—a predefined time interval may serve to separate a previous image frame that is taken up for feature extraction and/or comparison (or any other image processing step) and a next image frame that may be taken up for feature extraction and/or comparison (or any other image processing step). The time interval may be assessed based on time of generation of image frames (at the image sensor) or time of receipt of image frames at a processor for processing. For example, an image frame may be taken up for extraction and/or comparison (or any other image processing step) every 100 milliseconds. The time intervals between successive pairs of image frames taken up for extraction and/or comparison (or any other image processing step) may be uniform (i.e. the same for all pairs of image frames) or non-uniform (i.e. may vary across different pairs of image frames).

Number of sequentially generated image frames separating two image frames consecutively taken up for further processing—a predefined number of sequentially generated image frames (intermediate frames) may be required to separate two image frames that are consecutively taken up for feature extraction and/or comparison (or any other image processing step). The predetermined number of intermediate frames between successive pairs of image frames taken up for extraction and/or comparison (or any other image processing step) may be uniform (i.e. the same for all pairs of image frames) or non-uniform (i.e. may vary across different pairs of image frames).

Similarity or dissimilarity between an image frame under consideration for further processing and one or more image frames previously taken up for further processing—selection of image frames successively taken up for feature extraction and/or comparison (or any other image processing step) may be based on a minimum or maximum (or both a minimum and a maximum) threshold difference between the current image frame and one or more previous image frames taken up for feature extraction and/or comparison (or any other image processing step). By implementing a minimum threshold for differences between the current image frame and one or more frames previously taken up for feature extraction and/or comparison (or any other image processing step), the invention ensures that each image frame selected for further processing has perceptible differences compared to the earlier processed image frame—which avoids redundant processing on nearly identical frames. By implementing a maximum threshold for differences between the current image frame and one or more frames previously taken up for feature extraction and/or comparison (or any other image processing step), the invention ensures that each image frame selected for further processing is not substantially different as compared to the earlier processed image frame which improves the likehood that such a frame does not have a sudden large change and is suitable for extraction, comparison or for rendering a match (or non-match) determination. Differences between two image frames may be measured in terms of Manhattan distance, Euclidean distance, Mahalanobis distance, or any other measure of similarity or dissimilarity that may be applied or adapted to image frames.

As discussed above, each of the above assessment factors may serve as one or more predetermined criteria for eliminating unsuitable images without performing feature extraction and comparison operations thereon. Alternatively, these factors may serve as the basis for selection of iris segmentation and/or feature extraction operations most suited to the image frame under assessment. For example, a determination that iris shape is non-circular (i.e. does not meet a predefined circularity threshold) may provide basis for iris segmentation and feature extraction operations that do not make a circularity assumption.

The steps of feature extraction and/or comparison may be repeated for every frame that passes the elimination criteria described above. Thus, iris recognition may be terminated when match is found or upon a predetermined timeout, or at any time after a match is found. In a preferred embodiment, feature extraction and/or comparison steps may be repeated 3 or more times a second.

The invention additionally seeks to optimize the iris recognition process in video image capture mode, by implementing multiple pass feature extraction and/or comparison.

Figure 5:
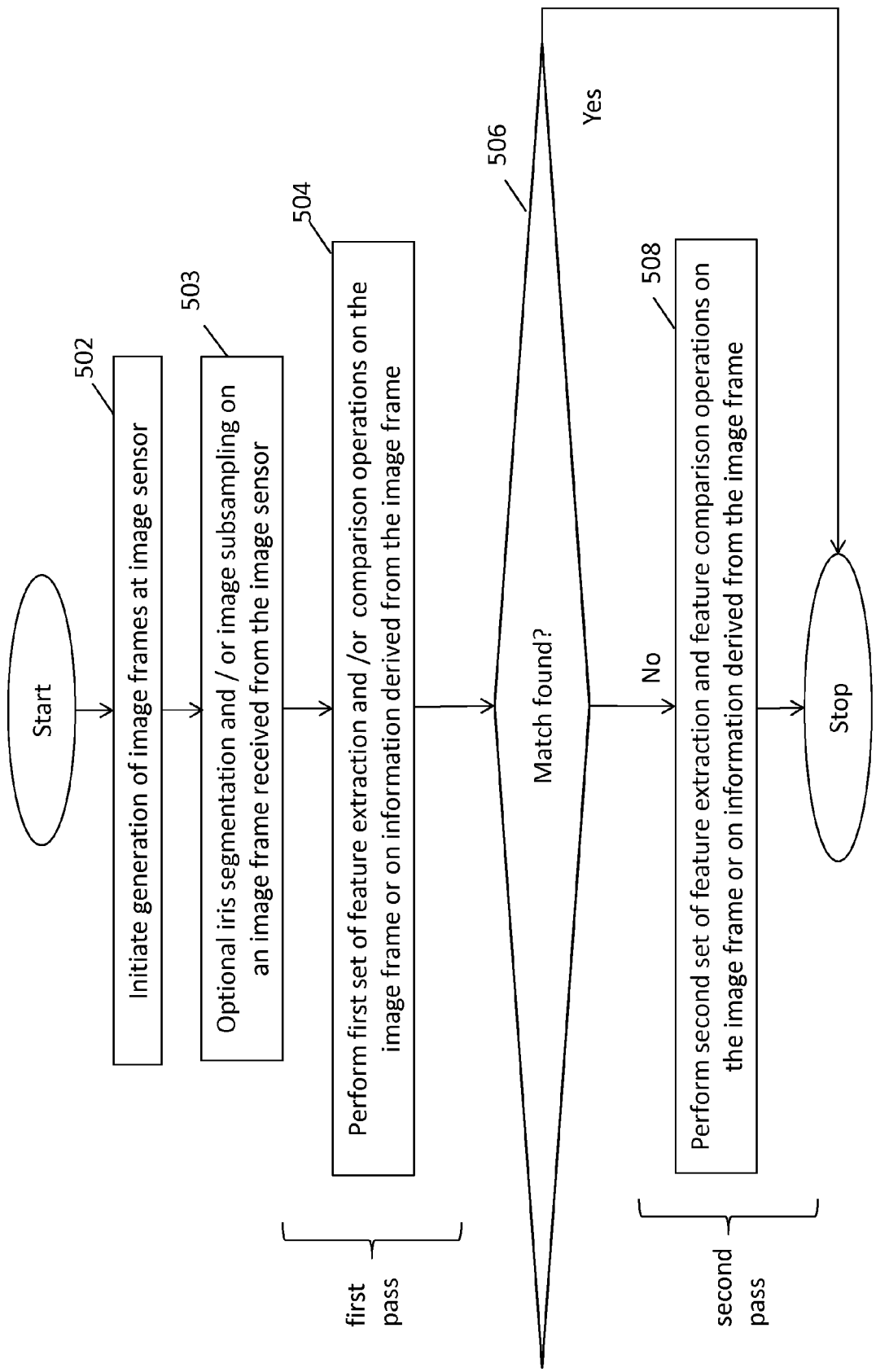

FIG. 5 is a flowchart describing an embodiment of the invention comprising a multiple pass extraction and/or comparison method for iris image recognition. At step 502 the method initiates generation of image frames at an image sensor. The image sensor may be configured to respond to an actuation instruction by capturing images either in single frame image capture mode or in video image capture mode. An image frame generated by the image sensor, which image frame includes an iris image, may be received from the image sensor at a processor.

At step 503, one or both of iris segmentation and image subsampling may be performed on an image frame generated by and received from the image sensor. Equally, the method may omit one or both or may integrate or subsume one or both into one or more of the other image processing steps.

At step 504, a first pass comprising execution of a first set of feature extraction and/or comparison operations, may be carried out either on the received image frame or on image information derived from the received image frame. The first set of feature extraction and/or comparison operations may comprise a first set of feature extraction operations and/or a first set of comparison operations respectively. The first set of feature extraction operations are performed on the received iris image for extracting a first iris feature set of the iris image within the received image frame. The first set of comparison operations may be performed (i) by comparing the first iris feature set with at least one stored iris image template or (ii) by comparing image information corresponding to the received image frame with stored image information corresponding to at least one iris image—which comparison operations are directed at rendering a match (or non-match) determination concerning the iris image within the received image frame.

In an embodiment of the method, the first set of feature extraction and/or comparison operations at step 504 may be performed on unaltered image data corresponding to the image frame as generated at step 502. In a preferred embodiment however, where the received image frame has been subjected to the steps of iris segmentation and/or image subsampling at step 503, feature extraction and/or comparison may be performed based on the output image data arising from said iris segmentation and/or image subsampling.

Step 506 determines whether the first pass results in an output corresponding to a pre-specified outcome (such as for example, if the first pass results in a match), and if so, the method moves to the next step.

If on the other hand, the first pass does not result in an output corresponding to a pre-specified outcome (e.g. if the first pass does not result in a match), a second pass is executed at step 508, comprising applying a second set of feature extraction and/or comparison operations on the received image frame or information derived from the received image frame.

In another embodiment, if the first pass does not result in an output corresponding to a pre-specified outcome, the image frame may be skipped based on some predetermined criteria.

The second set of feature extraction and comparison operations may comprise a second set of feature extraction operations and a second set of comparison operations respectively. The second set of feature extraction operations are performed on the received iris image for extracting a second iris feature set of the iris image within the received image frame. The second set of comparison operations may thereafter be performed by comparing the first iris feature set with at least one stored iris image template retrieved from an iris database—which comparison operations enable rendering of a match (or non-match) decision concerning the iris image within the received image frame.

In one embodiment of the method of FIG. 5, one or both of the first and second set of feature extraction operations may include at least one operation that is not included in the other set of feature extraction operations. In a particular embodiment, the second set of feature extraction operations includes at least one operation not included in the first set of feature extraction operations. Similarly, one or both of the first and second set of comparison operations may include at least one operation that is not included in the other set of comparison operations. In a particular embodiment however, the first and second set of comparison operations may be identical. In yet another particular embodiment, the first and second set of feature extraction operations may be identical.

An match (or non-match) decision is thereafter rendered based on the results of the second pass. In an embodiment of the method, the received image frame may be subjected to the steps of iris segmentation and/or image subsampling at step 503, and feature extraction and/or comparison may be performed on the output image data arising from said iris segmentation and/or image subsampling. In a preferred embodiment of the method however, the second set of feature extraction and/or comparison operations at step 508 are performed on unaltered image frame data corresponding to the image frame as generated at step 502 (i.e. on image frame data that has not been reduced by one or both of iris segmentation and iris subsampling), despite the image frame having been subjected to one or both of optional iris segmentation and image subsampling at step 503.

The first and second set of feature extraction and/or comparison operations, are respectively selected to optimize one or more of time efficiencies and accuracy.

In one embodiment of the method illustrated in FIG. 5, first and second set of feature extraction and/or comparison operations differ from each other in terms of one or more of (i) processing algorithms implemented, (ii) number of instructions for execution (iii) processing resources required (iv) algorithmic complexity, and (v) filters applied to the iris images.

In a preferred embodiment of the method illustrated in FIG. 5, the second set of feature extraction and/or comparison operations are more processor intensive and/or time intensive. As a consequence, executing the first pass is faster and/or requires fewer system resources than executing the second pass. In the event the results of the first pass are sufficient to render a match (or non-match) decision, the method entirely avoids having to run the more complex and/or more computationally intensive second pass feature extraction and/or comparison operations—which significantly improves the time required to render a match (or non-match) decision.

In an embodiment of the method of FIG. 5, where the image frame has been subjected to one or both of iris segmentation and image subsampling at step 503, the first and second set of feature extraction and/or comparison operations may be identical. In this embodiment, the first pass of feature extraction and/or comparison operations is performed on the output image frame data resulting from iris segmentation and/or image subsampling step 503, while the second pass of feature extraction and/or comparison operations is performed on image frame data corresponding to the acquired image frame that has not been reduced by image subsampling.

While not illustrated in FIG. 5, in the event the second pass at step 508 does not render results sufficient to enable a match (or non-match) decision or does not render an output corresponding to a pre-specified outcome, the method may receive another image frame from the image sensor and proceed to repeat steps 503 to 510. Alternatively, in such case the method may simply terminate without receiving another image frame.

Figure 6:
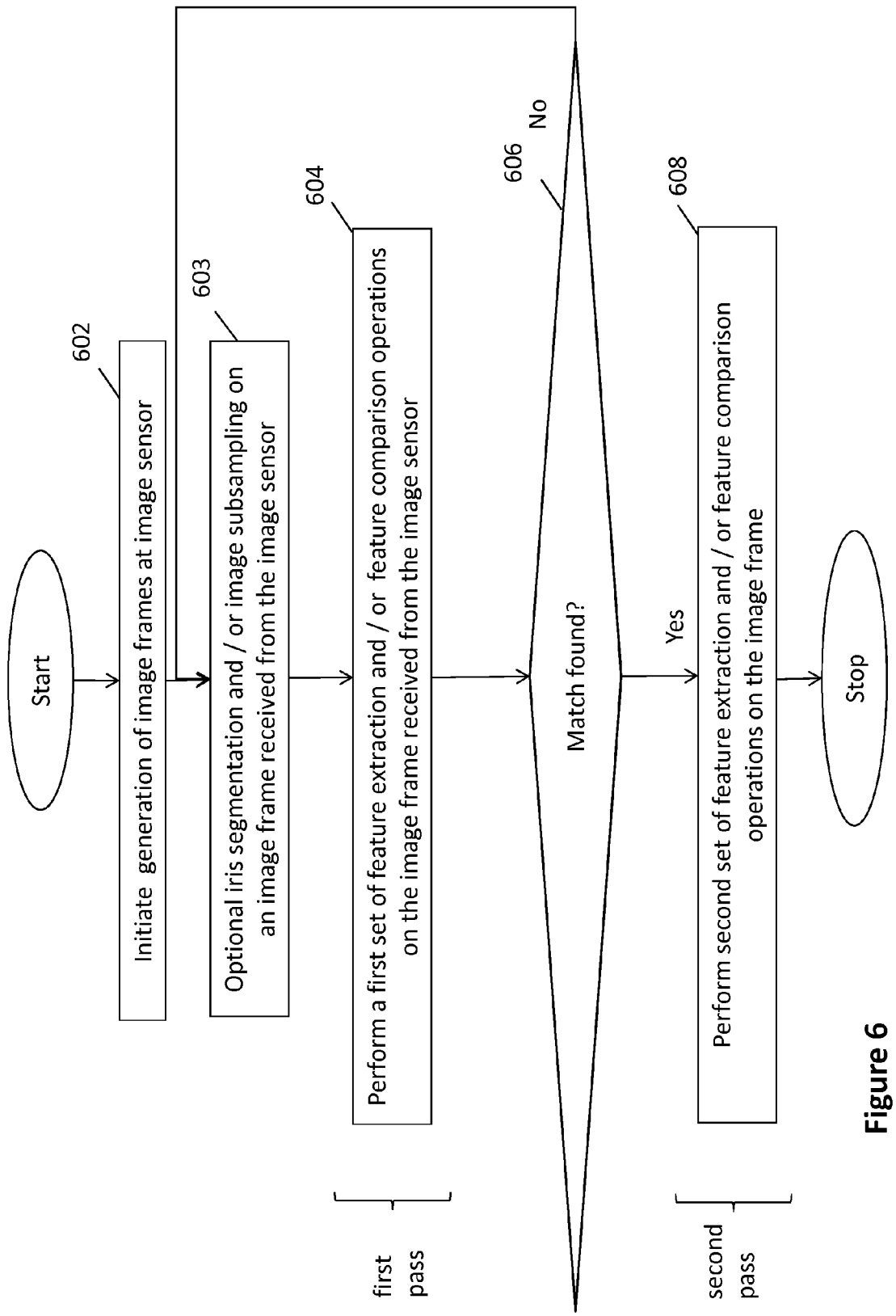

FIG. 6 is a flowchart illustrating another embodiment of the multiple pass extraction and/or comparison method. At step 602 the method initiates generation of image frames at an image sensor. The image sensor may be configured to respond to an actuation instruction by capturing images either in single frame image capture mode or in video image capture mode.

At step 603, one or both of iris segmentation and image subsampling may be performed on an image frame generated by the image sensor and received from the image sensor at a processor. Equally, the method may omit one or both or may integrate or subsume one or both into one or more of the other image processing steps.

At step 604, a first pass comprising execution of a first set of feature extraction and/or comparison operations, is carried out on an image frame received from the image sensor. In an embodiment of the method, the feature extraction and/or comparison operations at step 604 may be performed on unaltered image data corresponding to the image frame as received from the image sensor. In a preferred embodiment however, the received image frame has been subjected to the steps of iris segmentation and/or image subsampling at step 603, and feature extraction and/or comparison may be performed on the output image frame data resulting from said iris segmentation and/or image subsampling.

The first set of feature extraction and/or comparison operations may comprise a first set of feature extraction operations and/or a first set of comparison operations respectively. The first set of feature extraction operations may be performed on the received iris image for extracting a first iris feature set of the iris image within the received image frame. The first set of comparison operations may be performed (i) by comparing the first iris feature set with at least one stored iris image template retrieved from an iris database or (ii) by comparing image information corresponding to the received image frame with stored image information corresponding to at least one iris image—which comparison operations are directed at enabling rendering of a match (or non-match) decision concerning the iris image within the received image frame.

Step 606 determines if a match is found. If a match is found, the image frame under consideration is subjected to a second pass at step 608 comprising execution of a second set of feature extraction and/or comparison operations, and a second match (or non-match) decision is rendered at step 610 based on the outcome of the second pass. The second set of feature extraction and/or comparison operations may comprise a second set of feature extraction operations and a second set of comparison operations respectively. The second set of feature extraction operations are performed on the received iris image for extracting a second iris feature set of the iris image within the received image frame. The second set of comparison operations may be performed (i) by comparing the second iris feature set with at least one stored iris image template retrieved from an iris database or (ii) by comparing image information corresponding to the received image frame with stored image information corresponding to at least one iris image—which comparison operations are directed at enabling rendering of a match (or non-match) decision concerning the iris image within the received image frame.

If a match is not found at step 606, the method may receive another image frame from the image sensor and proceed to repeat steps 603 to 610. Alternatively, in such case the method may simply terminate without receiving another image frame.

In an embodiment of the method, the acquired image frame has been subjected to the steps of iris segmentation and/or image subsampling at step 603, and the second pass feature extraction and/or comparison at step 608 may be performed on the output image data arising from said iris segmentation and/or image subsampling. In a preferred embodiment of the method however, the second pass feature extraction and/or comparison operations at step 608 are performed on unaltered image data corresponding to the image frame as generated at step 602, despite the image frame having been subjected to one or both of optional iris segmentation and image subsampling at step 603.

In one embodiment of the method of FIG. 6, one or both of the first and second set of feature extraction operations may include at least one operation that is not included in the other set of feature extraction operations. In a particular embodiment, the second set of feature extraction operations includes at least one operation not included in the first set of feature extraction operations. Similarly, one or both of the first and second set of comparison operations may include at least one operation that is not included in the other set of comparison operations. In a particular embodiment however, the first and second set of comparison operations may be identical. In yet another particular embodyment, the first and second set of feature extraction operations may be identical.

The first and second set of feature extraction and/or comparison operations of the method illustrated in FIG. 6 (and particularly the feature extraction operations), may be selected to optimize time efficiencies and accuracy.

In an embodiment of FIG. 6, the first set of feature extraction and/or comparison operations at step 604 is at least (i) less computationally intensive (ii) requiring less processing resources or (iii) having a lower order of algorithmic complexity, than the second set of comparison and/or feature extraction operations at step 608. As a consequence, the first pass of feature extraction and/or comparison operations for identifying candidate image frames, may be executed on a large number of image frames from the set of image frames acquired by the image sensor (and in an embodiment, on all image frames from the set of acquired image frames), without significant time and resource overheads. On the other hand, the more complex/ resource intensive second pass of feature extraction and/or comparison operations only requires to be performed on image frames identified as likely candidates for enabling a match (or non-match) decision at the first pass. Taken together, the first and second passes of the method embodiment of FIG. 6 have been found to provide significantly improved response times for a match (or non-match) identity decision, without significant drops in accuracy.

Without limitation, the first and second sets of feature extraction and/or comparison operations of FIG. 6 may differ in terms of either or both of, number and type of filters applied during feature extraction to examine texture of the iris images.

The various two pass methods described above have been found to present significant improvements in processing time and in accuracy of results for iris based image recognition processing.

The present invention additionally presents an improved method for selection of iris image frames for further processing.

Based on the present state of the art, frame rate for image sensors used for iris imaging conventionally range between 5 frames per second and 240 frames per second. At these frame rates, an image sensor acquires a successive image frame at intervals between $\frac{1}{240}^{th}$ of a second and $\frac{1}{5}^{th}$ of a second. For example, for an imaging sensor configured to acquire video at 30 frames per second, each successive image frame is acquired at an interval of $\frac{1}{30}^{th}$ of a second.

It would be understood that motor function or physical reaction time of a subject is typically much slower than the frame rate of an image sensor. Movements or changes such as (i) changing alignment of the subject's head relative to an iris camera, (ii) movement of eyelids or eyelashes, or (iii) any other voluntary and involuntary movements or changes caused by the subject, the operator, or the immediate environment of handheld imaging apparatus, typically involve a time lag of at least $\frac{3}{10}^{th}$ to $\frac{4}{10}^{th}$ of a second, and in several cases even more time. It has therefore been observed that not every successive image frame within an iris video clip differs perceptibly from the immediately preceding image frame. More specifically, and depending on multiple factors including motor function of the subject and/or the operator and the immediate environment, perceptible changes between image frames are typically observed in non-successive image frames—which non-successive image frames can be anywhere between every alternate image frame and every $15^{th}$ successive frame.

The rate at which perceptible changes may be observed in image frames within a video stream, acquires relevance for the reason that extraction and comparison steps that are based on identical or substantially similar image frames would necessarily yield identical or substantially similar results. Accordingly, in the event a particular image frame is unsuitable for extraction and comparison, or for rendering a reliable match (or non-match) decision, selecting a next image frame having perceptible differences compared to the earlier image frame serves to improve the likelihood that the next image frame is suitable for extraction, comparison or rendering a match (or non-match) decision.

For example, in the event a subject's iris is obscured by a blinking eyelid or eyelash at a particular image frame, the likelihood that it remains obscured in the immediately succeeding frame remains high. However, the likelihood of obtaining an image frame of the unobscured eye increases as successive frames are skipped—as each skipped frame improves the probability that the eye's blinking motion has been completed.

Accordingly, instead of performing feature extraction and comparison on each successive frame within a video stream of a subject's iris, the invention skips intermediate frames to improve the probability that the next frame taken up for extraction and comparison differs perceptibly from the earlier frame.

Figure 7:
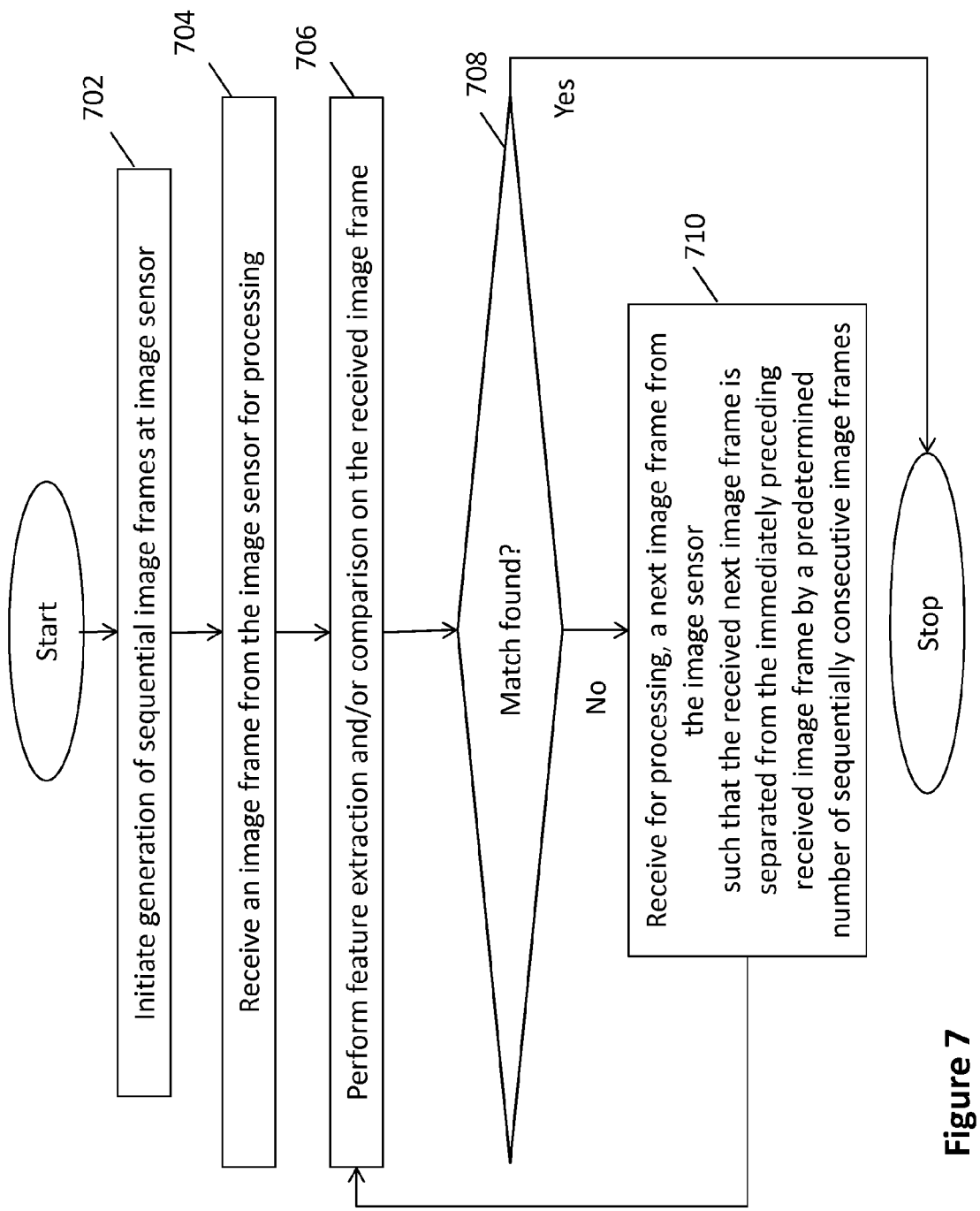

FIG. 7 illustrates an embodiment of this method.

At step 702 an image sensor of the imaging apparatus the method initializes sequential generation of image frames at an image sensor in video capture mode.

At step 704, an image frame is received from the image sensor, at a processor. The image frame received at step 704 may be the initial image frame within the sequence of image frames generated, or alternatively may be any other image frame therewithin.

Step 706 thereafter implements extraction and/or comparison operations on the received image frame. The extraction and/or comparison operations of step 706 may respectively comprise a set of feature extraction operations and a set of comparison operations. The set of feature extraction operations are performed on the received iris image for extracting an iris feature set of the iris image within the received image frame. The set of comparison operations may be performed (i) by comparing the iris feature set with at least one stored iris image template retrieved from an iris database or (ii) by comparing image information corresponding to the received image frame with stored image information corresponding to at least one iris image—which comparison operations are directed at enabling rendering of a match (or non-match) decision concerning the iris image within the received image frame.

At step 708 the method determines whether a match is found.

If a match is not found at step 708, step 710 receives a next image frame from the generated set of sequential image frames, wherein the next image frame is selected from among the image frames sequentially generated by the image sensor such that the next image frame is separated from the earlier selected image frame in accordance with a predetermined criteria. Feature extraction and/or comparison is performed on the selected next image frame at step 706 and the method continues until a match is found.

The predetermined criteria for selection of a next image frame from among image frames sequentially generated by the image sensor may comprise any criteria that enables selection of a next image frame for processing.

In an embodiment of the invention, the predetermined criteria defines a number of sequentially generated image frames i.e. intermediate frames that are required to separate two image frames that are consecutively taken up for feature extraction and/or comparison. For example, the predetermined criteria may specify the number of intermediate frames required to separate a first image frame and a next image frame that are consecutively taken up for feature extraction and/or comparison.

In an embodiment of the invention, the predetermined criteria may require a uniform distribution of intermediate frames i.e. that every pair of image frames consecutively taken up for feature extraction and/or comparison shall be separated by the same number of image frames sequentially generated by the image sensor. For example, the predetermined criteria may specify that each image frame taken up for feature extraction and/or comparison shall be separated from the immediately preceding image frame taken up for extraction and/or comparison by one image frame—in which case every alternate image frame generated by the image sensor would be taken up for feature extraction and/or comparison. In another embodiment, the predetermined criteria may require a non-uniform distribution of intermediate frames i.e. the number of intermediate image frames separating a first pair of image frames consecutively taken up for feature extraction and/or comparison may be different from the number of intermediate image frames separating a second pair of image frames consecutively taken up for feature extraction and/or comparison. For example, the predetermined criteria may specify that the first and second image frames taken up for feature extraction and/or comparison shall be separated by zero intermediate frames; the second and third image frames taken up for feature extraction and/or comparison shall be separated by two intermediate frames; the third and fourth image frames taken up for feature extraction and/or comparison shall be separated by one intermediate frame; and so on. The non-uniform pattern of distribution of intermediate frames may be varied to optimize efficiency of the iris recognition method.

In another embodiment of the invention, the predetermined criteria defines a time interval separating time of receiving (from the image sensor) a first image frame that is taken up for feature extraction and/or comparison and time of receiving (from the second image sensor) a next image frame that may be taken up for feature extraction and/or comparison. For example, the predetermined criteria may specify that an image frame may be taken up for extraction and/or comparison every 100 milliseconds. The time interval may further specify whether the interval is to be measured based on generation of the image frames at the image sensors (e.g. an image frame generated every 100 milliseconds at the image sensor may be taken up for extraction and/or comparison) or based on receipt of the image frames from the image sensor (e.g. image frames received from the image sensor every 100 milliseconds may be taken up for extraction and/or comparison). As in the case of embodiments discussed above, the time intervals between successive pairs of image frames taken up for extraction and/or comparison may be uniform or non-uniform.

In yet another embodiment, the predetermined criteria may comprise availability status of a resource required for performing image processing or comparison.

The predetermined criteria for selection of two successive image frames for extraction and/or comparison may be a function of one or more of (i) frame speed of the image sensor (ii) human motor function and (iii) time involved in any environment state changes that may be anticipated as a consequence of the iris image acquisition process.

In another embodiment of the invention generally described in connection with FIG. 7, the predetermined criteria for selection of image frames successively taken up for feature extraction and/or comparison is a minimum threshold difference between a first image frame and a next image frame successively taken up for feature extraction and/or comparison. By implementing a minimum threshold for differences between two image frames successively taken up for feature extraction and/or comparison, the invention ensures that each image frame selected for further processing has perceptible differences compared to the earlier processed image frame—which improves the likelihood that such image frame is suitable for extraction, comparison or rendering a match (or non-match) decision. Differences between two image frames may be measured in terms of Manhattan distance, Euclidean distance, Mahalanobis distance, or any other measure of similarity or dissimilarity that may be applied or adapted to image frames. Similarly, minimum threshold difference between a first image frame and a next image frame successively taken up for feature extraction and/or comparison, may be specified in terms of Manhattan distance, Euclidean distance, Mahalanobis distance, or any other measure of similarity or dissimilarity that may be applied or adapted to image frames.

Figure 8:
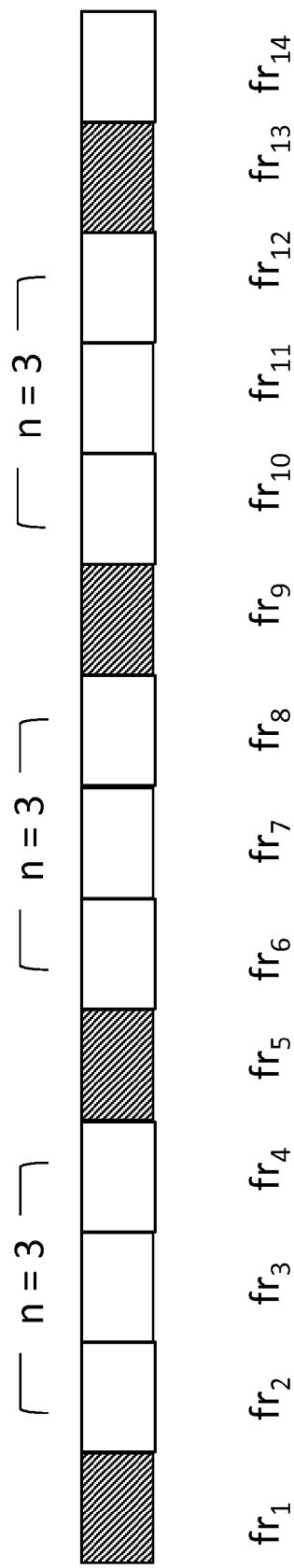
FIG. 8 illustrates an implementation of the method for iris based recognition according to the present invention.

FIG. 8 illustrates an exemplary implementation of the method of FIG. 7, wherein each selected next image frame is separated from the earlier selected image frame by n frames. In the illustration of FIG. 7:

- the set of sequential image frames acquired in video mode consist of a total of fourteen consecutive frames ($fr_1$ to $fr_{14}$)
- the predetermined number of frames (n) separating successively selected image frames is 3 frames (i.e. n=3) and
- the image frame first selected for feature extraction and/or comparison is the first image frame in the sequence ($fr_1$).

Applying the image frame selection criteria of method step 710, image frames $fr_5$, $fr_9$ and $fr_{13}$ would be successively selected for feature extraction and/or comparison under the method described in connection with FIG. 8—with a view to improving the likelihood that each image frame selected for extraction and/or comparison differs perceptibly from the previously selected frame.

In a preferred embodiment of the method described in connection with FIGS. 7 and 8, the predetermined number of frames separating successively selected image frames may be between 0 and 60 frames.

Figure 9:
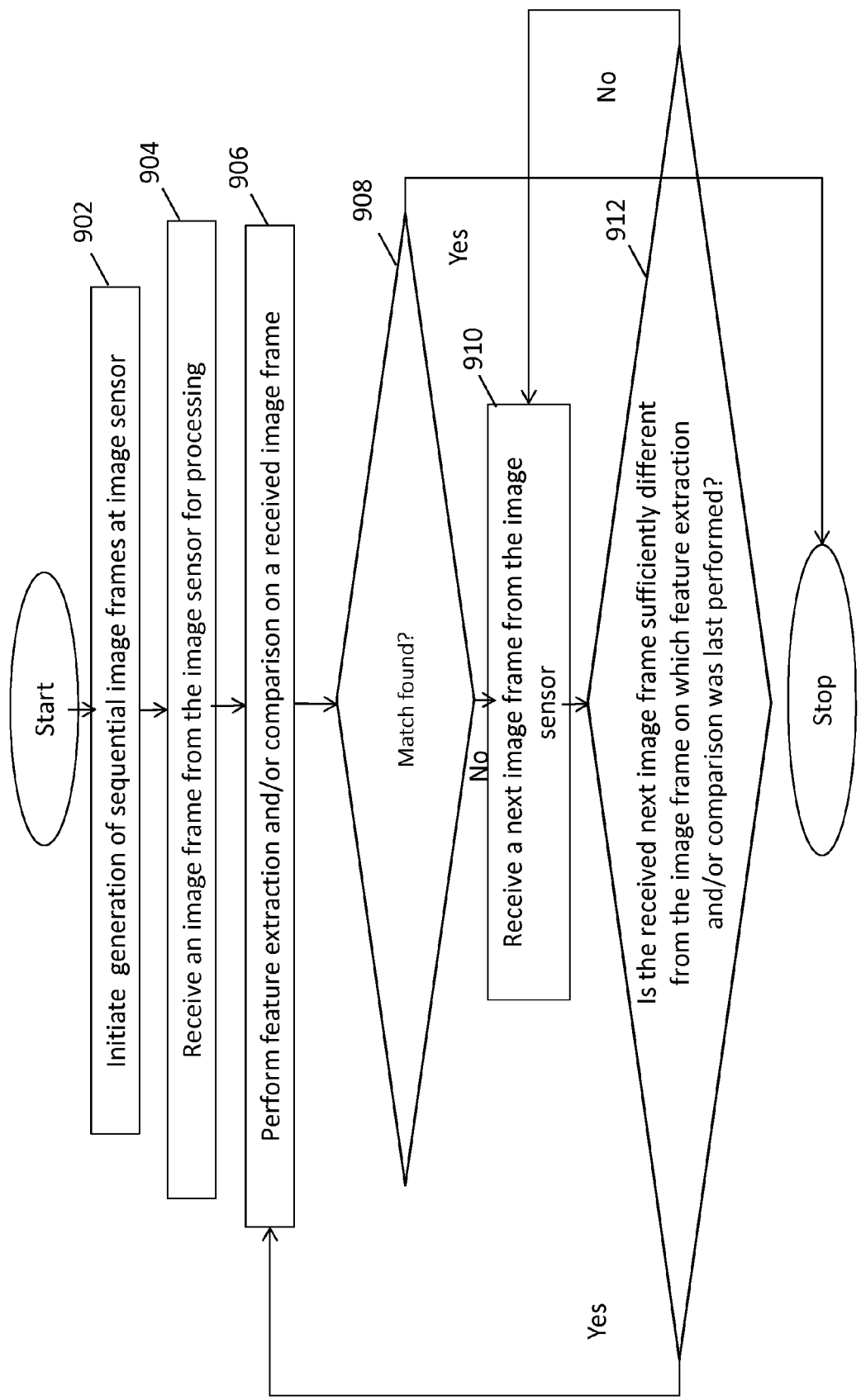
FIG. 9 is a flowchart illustrating a method for iris based recognition according to the present invention.

FIG. 9 illustrates another embodiment of the method wherein feature extraction and/or comparison is not performed on each sequential frame successively generated by an image sensor. In this embodiment, an image frame is taken up for feature extraction and/or comparison subsequent to a determination that the image frame is sufficiently different from the image frame on which feature extraction and/or comparison was last performed.

At step 902 the method initiates generation of image frames at an image sensor. The image sensor may be configured to respond to an actuation instruction by capturing images either in single frame image capture mode or in video image capture mode.

At step 904, an image frame is received from the image sensor at a processor for processing. Thereafter at step 906, the processor implements extraction and/or comparison operations on the received image frame.

At step 908 the method determines whether the results of extraction and/or comparison step 906 are sufficient to enable a match (or non-match) decision, and if so, the method may render a match (or non-match) decision and terminate.

If the results of step 906 are insufficient to enable a match (or non-match) decision, step 910 receives a next image frame from the image sensor.

At step 912 the method processes the received next image frame to determine whether said next image frame is sufficiently different from the image frame on comparison and/or extraction was last performed. Differences between two image frames may be measured in terms of Manhattan distance, Euclidean distance, Mahalanobis distance, or any other measure of similarity or dissimilarity that may be applied or adapted to image frames.

In the event the received next image frame is sufficiently different from the image frame on which comparison and/or extraction was last performed, the method reverts to step 906 and feature extraction and comparison operations are performed on the image frame. If the received next image frame is not sufficiently different from the image frame on which feature extraction and/or comparison was last performed, the method reverts to step 910 wherein a next image frame is received from the image sensor.

The method may continue until a match (or non-match) decision is reached, or until no additional frames remain to be received from the image sensor, or until a feature extraction and/or comparison have been performed on a predetermined number of frames, or upto expiry of a predetermined interval of time or other termination event.

Figure 10:
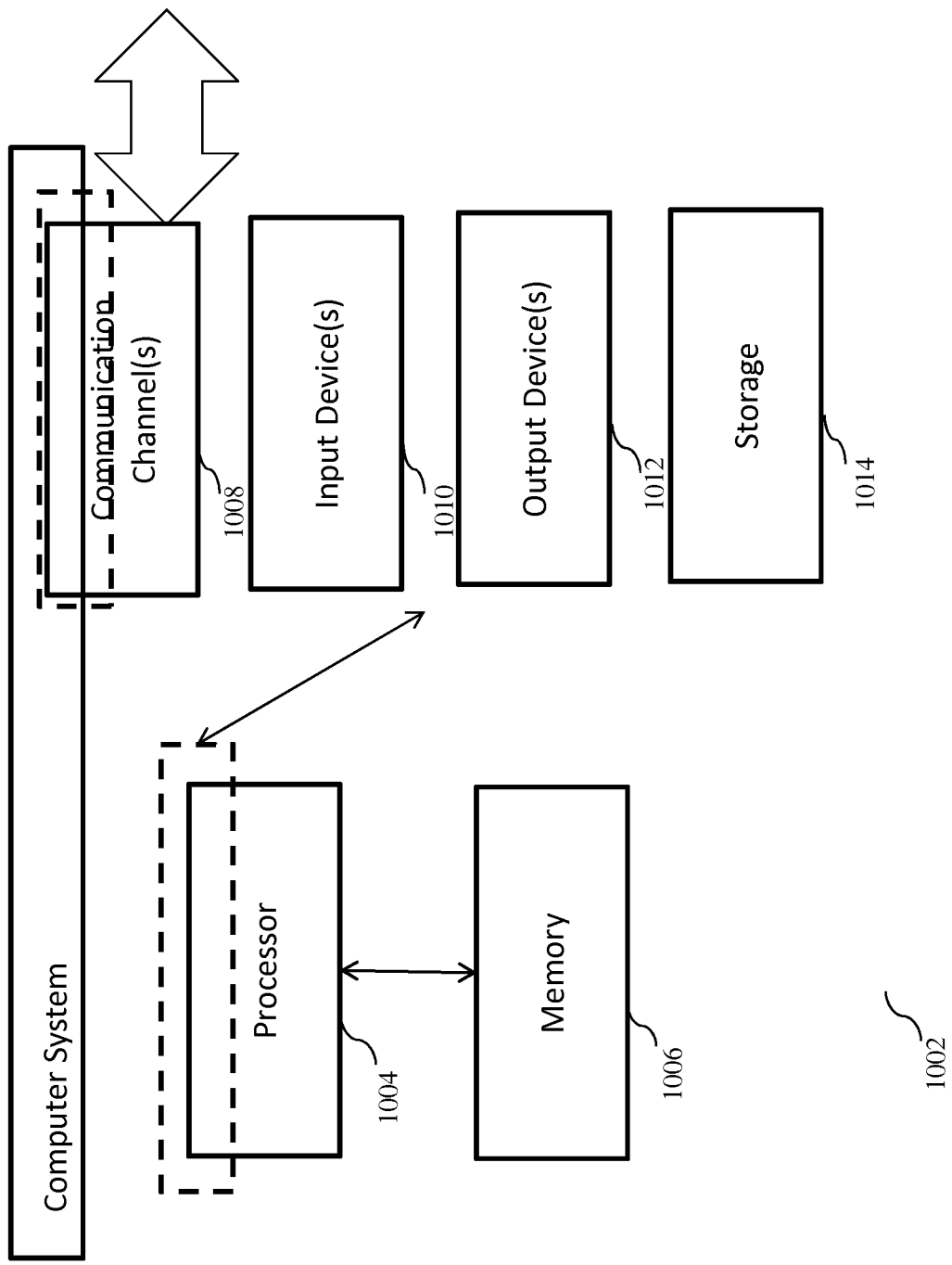
FIG. 10 illustrates an exemplary computer system in which various embodiments of the invention may be implemented.

FIG. 10 illustrates an exemplary system in which various embodiments of the invention may be implemented.

The system 1002 comprises at-least one processor 1004 and at-least one memory 1006. The processor 1004 executes program instructions and may be a real processor. The processor 1004 may also be a virtual processor. The computer system 1002 is not intended to suggest any limitation as to scope of use or functionality of described embodiments. For example, the computer system 1002 may include, but not limited to, one or more of a general-purpose computer, a programmed microprocessor, a micro-controller, an integrated circuit, and other devices or arrangements of devices that are capable of implementing the steps that constitute the method of the present invention. In an embodiment of the present invention, the memory 1006 may store software for implementing various embodiments of the present invention. The computer system 1002 may have additional components. For example, the computer system 1002 includes one or more communication channels 1008, one or more input devices 1010, one or more output devices 1012, and storage 1014. An interconnection mechanism (not shown) such as a bus, controller, or network, interconnects the components of the computer system 1002. In various embodiments of the present invention, operating system software (not shown) provides an operating environment for various softwares executing in the computer system 1002, and manages different functionalities of the components of the computer system 1002.

The communication channel(s) 1008 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 1010 may include, but not limited to, a touch screen, a keyboard, mouse, pen, joystick, trackball, a voice device, a scanning device, or any another device that is capable of providing input to the computer system 1002. In an embodiment of the present invention, the input device(s) 1010 may be a sound card or similar device that accepts audio input in analog or digital form. The output device(s) 1012 may include, but not limited to, a user interface on CRT or LCD, printer, speaker, CD/DVD writer, LED, actuator, or any other device that provides output from the computer system 1002.

The storage 1014 may include, but not limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1002. In various embodiments of the present invention, the storage 1014 contains program instructions for implementing the described embodiments.

In an embodiment of the present invention, the computer system 1002 is part of a distributed network where various embodiments of the present invention are implemented for rapidly developing end-to-end software applications.

While not illustrated in FIG. 10, the system of FIG. 10 may further include some or all of the components of an imaging apparatus of the type more fully described in connection with FIG. 2 hereinabove.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1002. The method described herein is typically implemented as a computer program product, comprising a set of program instructions which is executed by the computer system 1002 or any other similar device. The set of program instructions may be a series of computer readable codes stored on a tangible medium, such as a computer readable storage medium (storage 1014), for example, diskette, CD-ROM, ROM, flash drives or hard disk, or transmittable to the computer system 1002, via a modem or other interface device, over either a tangible medium, including but not limited to optical or analogue communications channel(s) 1008, or implemented in hardware such as in an integrated circuit. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A method for iris based biometric recognition, comprising the steps of:
   (a) receiving from an image sensor, an image selected from a set of images sequentially generated by the image sensor;
   (b) determining whether the received image includes an iris;
   (c) repeating steps (a) and (b) until the received image includes an iris;
   (d) responsive to determining that the received image includes an iris, comparing iris information corresponding to such received image with stored iris information corresponding to at least one iris;
   (e) rendering an identity decision based on an output of the comparison; and
   (f) responsive to the identity decision at step (e) comprising a non-match identity decision, and subject to non-occurrence of a termination event, repeating at least steps (a) and (d) to (e) in a successive iteration such that:
   an image compared at step (d) of the successive iteration is:
   selected from a first set of images that are sequentially generated by the image sensor subsequent to generating the image compared at step (d) of an immediately preceding iteration; and
   separated from the image compared at step (d) of the immediately preceding iteration by a second set of images, wherein:
   said second set of images are generated by the image sensor subsequent to generation of the image compared at step (d) of the immediately preceding iteration and prior to generation of the image compared at step (d) of the successive iteration;
   said second set of images are not subjected to comparison with stored iris information; and
   number of images within the second set of images is (i) dependent on a predefined criteria, and (ii) independent of image quality assessment that is implemented on one or more images received from the image sensor subsequent to the step (d) image comparison of the immediately preceding iteration.

2. The method as claimed in claim 1, wherein the comparison at step (d) comprises comparing an iris feature set generated by feature extraction performed on the received iris image, with the stored iris information.

3. The method as claimed in claim 1,
   wherein the termination event may comprise any of (i) expiry of a predetermined time interval, or (ii) comparison of a predetermined number of received iris images, or (iii) rendering of a match decision based on comparison between iris information corresponding to a received iris image and the stored iris information, or (iv) distance between the image sensor and the subject exceeding a predetermined maximum distance, or (v) a determination that a subject's eye has moved out from a defined vicinity of the image sensor.

4. The method as claimed in claim 1, wherein a match decision is rendered responsive to the acquired iris image satisfying a predetermined degree of similarity with stored iris information corresponding to at least one iris.

5. The method as claimed in claim 1, wherein,
   image subsampling is performed on an image received at step (a), to generate a subsampled image; and
   the determination at step (b) comprises an examination of the subsampled image.

6. A method for iris based biometric recognition, comprising the steps of:
   (a) receiving an image from an image sensor, wherein the received image includes an iris image;
   (b) comparing iris information corresponding to such received iris image with stored iris information corresponding to at least one iris; and
   (c) rendering a match or non-match decision based on output of the comparison;
   wherein responsive to rendering of a non-match decision at step (c) and subject to non-occurrence of a termination event, steps (a) to (c) are repeated in a successive iteration such that:
   the image received at step (a) of the successive iteration is:
   selected from a first set of images sequentially generated by the image sensor and is separated from the image received at step (a) of an immediately preceding iteration of steps (a) to (c) by at least one intermediate image, which intermediate image is generated by the image sensor subsequent to generation of the image compared at step (b) of the immediately preceding iteration and prior to generation of the image compared at step (b) of said successive iteration; and
   separated from the image compared at step (b) of the immediately preceding iteration by a second set of images, wherein:
   said second set of are generated by the image sensor subsequent to generation of the image compared at step (b) of the immediately preceding iteration and prior to generation of the image compared at step (b) of the successive iteration;
   said second set of images are not subjected to comparison with stored iris information; and
   number of images within the second set of intermediate images is (i) dependent on a predefined criteria, and (ii) independent of image quality assessment that is implemented on one or more images received from the image sensor subsequent to the step (d) image comparison of the immediately preceding iteration.

7. The method as claimed in claim 6, wherein the comparison at step (d) comprises a comparison between an iris feature set generated by feature extraction performed on the received iris image, and the stored iris information.

8. The method as claimed in claim 6,
   wherein the predefined criteria specifies at least one of:
   a minimum number of images within the second set of images;
   a minimum image processor resource availability requirement for performing image processing or comparison;
   elapse of a minimum time interval since occurrence of a defined event corresponding to the image compared at step (d) of the immediately preceding iteration; and detection of a minimum image difference between the images respectively processed within the immediately preceding iteration and the successive iteration;

or the termination event may comprise any of (i) expiry of a predetermined time interval, or (ii) conclusion of comparison of a predetermined number of received iris images, or (iii) rendering of a match decision based on comparison between iris information corresponding to a received iris image and the stored iris information or (iv) distance between the image sensor and the subject exceeding a predetermined maximum distance, or (v) a determination that a subject's eye has moved out from a defined vicinity of the image sensor.

9. The method as claimed in claim 6, wherein a match decision is rendered responsive to the received iris image satisfying a predetermined degree of similarity with stored iris information corresponding to at least one iris.

10. The method as claimed in claim 6, wherein, image subsampling is performed on the image received at step (a) to generate a subsampled image; and the determination at step (b) whether the received iris image satisfies at least one predetermined criteria is based on the subsampled image.

11. A method for iris based biometric recognition, comprising the steps of:
(a) initializing sequential generation of image frames by an image sensor;
(b) selecting an image frame generated by the image sensor;
(c) comparing image information corresponding to the selected image frame with stored iris image information corresponding to at least one iris image; and
(d) responsive to the comparison at step (c) rendering a non-match decision, selecting another image frame generated by the image sensor and repeating steps (c) and (d), wherein the selected another image frame is:
selected from a first set of images sequentially generated by the image sensor and is separated from the image selected for an immediately preceding iteration of steps (c) and (d) by at least one intermediate image, which intermediate image is generated by the image sensor subsequent to generation of the image compared at step (c) of the immediately preceding iteration and prior to generation of the image compared at step (c) of said successive iteration; and
separated from the image compared at step (c) of the immediately preceding iteration by a second set of images, wherein:
said second set of are generated by the image sensor subsequent to generation of the image compared at step (c) of the immediately preceding iteration and prior to generation of the image compared at step (c) of said successive iteration;
said second set of images are not subjected to comparison with stored iris information; and
number of images within the second set of images is (i) dependent on a predefined criteria, independent of image quality assess ent that is s implemented on one or more images received from the image sensor subsequent to the step (c) image comparison of the immediately preceding iteration.

12. The method as claimed in claim 11, wherein the comparison at step (c) is preceded by a step of performing feature extraction on the first image for extracting an iris feature set of an imaged iris within the first image, and the comparison at step (c) comprises comparing the extracted iris feature set with the stored iris image information.

13. A computer program product for iris based biometric recognition, comprising a non-transitory computer usable medium having a computer readable program code embodied therein, the computer readable program code comprising instructions for:
(a) receiving an image from an image sensor;
(b) determining whether the received image includes an iris;
(c) repeating steps (a) and (b) until the received image includes an iris;
(d) responsive to determining that the received image includes an iris, comparing iris information corresponding to such received image with stored iris information corresponding to at least one iris;
(e) rendering an identity decision based on an output of the comparison; and
(f) responsive to the identity decision at step (e) comprising a non-match identity decision, and subject to non-occurrence of a termination event, repeating at least steps (a) and (d) to (e) in a successive iteration such that:
an image compared at step (d) of the successive iteration is:
selected from a first set of images that are sequentially generated by the image sensor subsequent to generating the image compared at step (d) of an immediately preceding iteration; and
separated from the image compared at step (d) of the immediately preceding iteration by a second set of images comprising one or more images, wherein:
said second set of images are generated by the image sensor subsequent to generation of the image compared at step (d) of the immediately preceding iteration and prior to generation of the image compared at step (d) of the successive iteration;
said second set of images are not subjected to biometric feature related image processing steps; and
number of images within the second set of images is (i) dependent on a predefined criteria, and (ii) independent of image quality assessment that is implemented on one or more images received from the image sensor subsequent to the step (d) image comparison of the immediately preceding iteration.

14. A system for iris based biometric recognition, comprising:
an image sensor; and
a processing device configured for:
(a) receiving an image from an image sensor;
(b) determining whether the received image includes an iris;
(c) repeating steps (a) and (b) until the received image includes an iris;
(d) responsive to determining that the received image includes an iris, comparing iris information corresponding to such received image with stored iris information corresponding to at least one iris;
(e) rendering a match decision or a non-match decision based on an output of the comparison; and
(f) responsive to the identity decision at step (e) comprising a non-match identity decision, and subject to non-occurrence of a termination event, repeating at least steps (a) and (d) to (e) in a successive iteration such that:

an image compared step (d) of the successive iteration is:
selected from a first set of images that are sequentially generated by the image sensor subsequent to generating the image compared at step (d) of an immediately preceding iteration; and
separated from the image compared at step (d) of the immediately preceding iteration by a second set of images, wherein:
said second set of images are generated by the image sensor subsequent to generation of the image compared at step (d) of the immediately preceding iteration and prior to generation of the image compared at step (d) of the successive iteration;
said second set of images are not subjected to biometric feature related image processing steps; and
number of images within the second set of images is (i) dependent on a predefined criteria, and (ii) independent of image quality assessment that is implemented on one or more images received from the image sensor subsequent to the step (d) image comparison of the immediately preceding iteration.

15. The method as claimed in claim 1, wherein the predefined criteria specifies at least one of:
a minimum number of images within the second set of images;
a minimum image processor resource availability requirement for performing image processing or comparison;
elapse of a minimum time interval since occurrence of a defined event corresponding to the image compared at step (d) of the immediately preceding iteration; and
detection of a minimum image difference between the images respectively processed within the immediately preceding iteration and the successive iteration.

16. The computer program product as claimed in claim 13, wherein the predefined criteria specifies at least one of:
a minimum number of images within the second set of images;
a minimum image processing resource availability requirement for performing image processing or comparison;
elapse of a minimum time interval since occurrence of a defined event corresponding to the image compared at step (d) of the immediately preceding iteration; and
detection of a minimum image difference between the images respectively processed within the immediately preceding iteration and the successive iteration.

17. The system as claimed in claim 14, wherein the predefined criteria specifies at least one of:
a minimum number of images within the second set of images;
a minimum image processing resource availability requirement for performing image processing or comparison;
elapse of a minimum time interval since occurrence of a defined event corresponding to the image compared at step (d) of the immediately preceding iteration; and
detection of a minimum image difference between the images respectively processed within the immediately preceding iteration and the successive iteration.

18. The method as claimed in claim 1, wherein said second set of images comprises at least one image.

19. The computer program product as claimed in claim 13, wherein said second set of images comprises at least one image.

20. The system as claimed in claim 14, wherein said second set of images comprises at least one image.

21. The method as claimed in claim 1, wherein the number of images within the second set of images is unrelated to any assessment regarding occurrence or non-occurrence of a termination event.

22. The method as claimed in claim 1, wherein the number of images within the second set of images is unrelated to any access related or denial of access related decision.

23. The method as claimed in claim 11, wherein the predefined criteria specifies at least one of: (i) availability of at least one image processing resource to perform image processing or comparison, or (ii) elapse of a minimum time interval since occurrence of a defined event corresponding to a previously selected image frame, or (iii) a minimum number of sequentially generated image frames that are not subjected to biometric feature related image processing steps separating a previously selected image frame and an image frame being considered for selection, or (iv) detection of a minimum difference between a previously selected image frame and an image frame being considered for selection.

* * * * *

UNITED STATES PATENT AND TRADEMARK OFFICE
CERTIFICATE OF CORRECTION

PATENT NO. : 9,582,716 B2  
APPLICATION NO. : 14/021721  
DATED : February 28, 2017  
INVENTOR(S) : Salil Prabhakar Page 1 of 1

It is certified that error appears in the above-identified patent and that said Letters Patent is hereby corrected as shown below:

In the Claims

At Column 24, Line 56, Claim 7 should read "…at step (b)…".

At Column 24, Line 67, Claim 8 should read "step (b) of the…".

At Column 25, Line 59, Claim 11 should read "(i) dependent on a predefined criteria, and (ii) independent".

At Column 25, Line 60, Claim 11 should read "of image quality assessment that is implemented".

Signed and Sealed this  
Twenty-fifth Day of July, 2017

Joseph Matal  
*Performing the Functions and Duties of the*  
*Under Secretary of Commerce for Intellectual Property and*  
*Director of the United States Patent and Trademark Office*